Sept. 16, 1958     T. A. HARRIS ET AL     2,851,856
MEANS FOR CONTROLLING THE SUPPLY OF LIQUID FUEL TO JET-PROPELLED
AERIAL BODIES IN RESPONSE TO FLUID PRESSURES SELECTED BY
AUTOMATICALLY OPERABLE SELECTOR DEVICES
Filed June 18, 1953     3 Sheets-Sheet 1
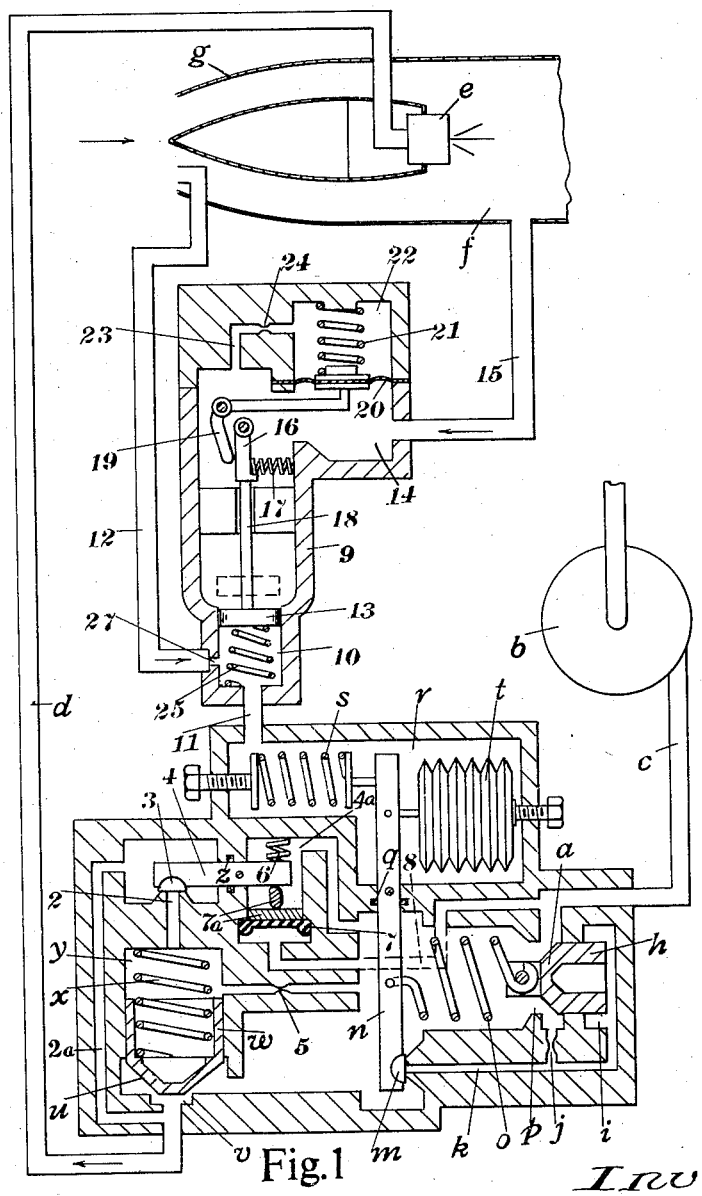

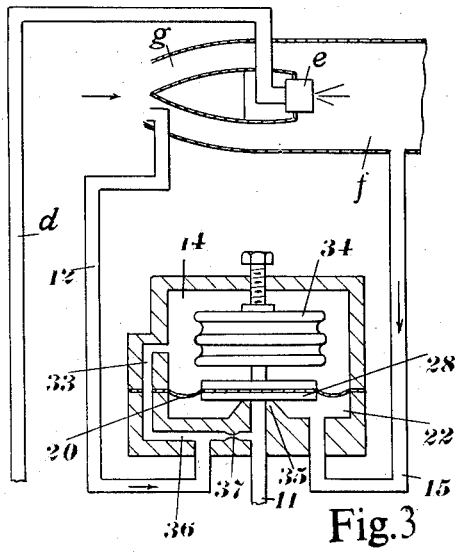
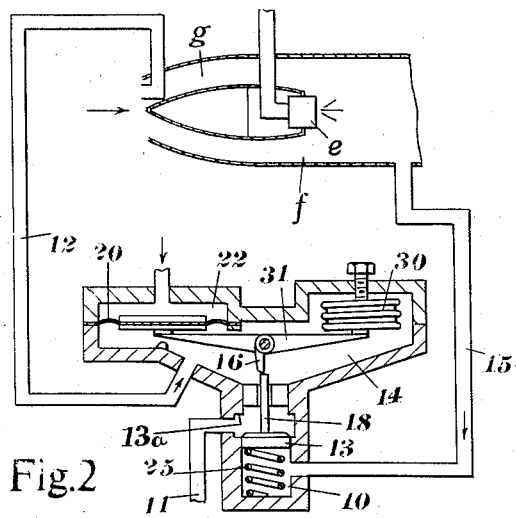

United States Patent Office 2,851,856
Patented Sept. 16, 1958

2,851,856

MEANS FOR CONTROLLING THE SUPPLY OF LIQUID FUEL TO JET-PROPELLED AERIAL BODIES IN RESPONSE TO FLUID PRESSURES SELECTED BY AUTOMATICALLY OPERABLE SELECTOR DEVICES

Thomas Alfred Harris, Mappleborough Green, near Studley, and Charles Herbert Bottoms, Simonstone, near Padiham, England, assignors to Joseph Lucas (Industries) Limited, Birmingham, England Application June 18, 1953, Serial No. 362,448

6 Claims. (Cl. 60—39.28)

This invention relates to means for controlling the supply of liquid fuel to the combustion chamber of a jet-propelled aerial body, and particularly a body of the so-called ram-jet type.

In previous proposals it has been customary to arrange for the rate of supply of liquid fuel to the combustion chamber to be controlled by a mechanism responsive (at least in part) to the pressure at the entrance to the combustion chamber, which pressure depends on the rate of combustion of fuel in the chamber. The said method of control is, however, not entirely satisfactory as it may result in an inadequate fuel supply when combustion is initiated in the combustion chamber, and the object of the present invention is to enable the rate of supply of fuel to be controlled in a more satisfactory manner.

The invention comprises an automatic selector device whereby the fuel control means is rendered responsive to the air-pressure at the entrance to the air conduit leading to the combustion chamber until a predetermined pressure condition is attained, the control means being thereafter rendered responsive (wholly or mainly) to the pressure in the combustion chamber.

In the accompanying drawings:

Figure 1 represents diagrammatically a fuel control means having combined with it a selector device in accordance with the invention.

Figures 2, 3 and 4 represent other typical forms of the selector device.

Figure 4:
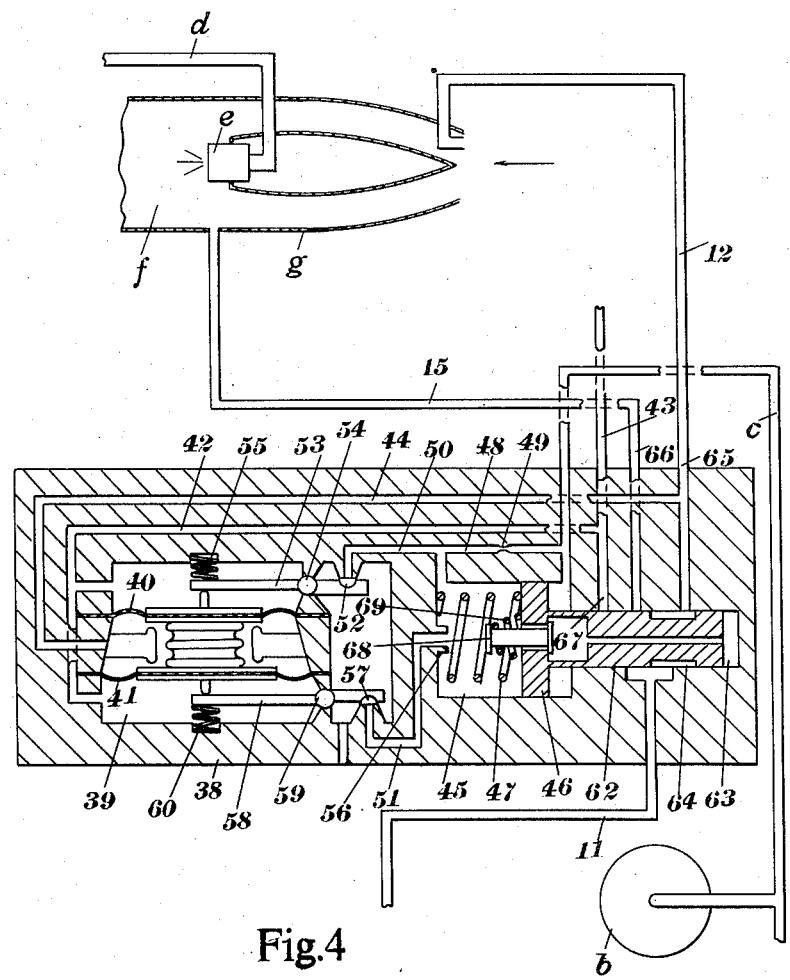

Referring to Figure 1, the fuel control means shown in the lower part of the drawing comprises a throttle $a$ for controlling the flow of fuel from a pump $b$ along pipes $c$, $d$ to the burner nozzle $e$ in the combustion chamber $f$ of the aerial body $g$. The throttle $a$ is formed on one end of the servo-piston $h$ which slides in a chamber $i$. Fuel supplied through the pipe $c$ passes to the right-hand end of the chamber $i$ through a restricted orifice $j$, which latter is also in communication with a vent $k$ controlled by a closure member $m$ on a lever $n$, the latter being connected to the throttle $a$ by a tension spring $o$. When the vent is closed, the throttle is moved towards the orifice $p$ by the spring $o$ for restricting the flow of fuel to the nozzle $e$. When the vent is open the preponderating fuel pressure acting on the front left-hand end of the piston $h$ moves the latter and the throttle away from the said orifice for increasing the fuel supply to the nozzle. The lever $n$ extends through a seal $q$ to a chamber $r$ and the opposite sides of the lever are under the action of a spring $s$ and an evacuated elastic capsule $t$. The capsule is responsive to air or other gas pressure existing in different parts of the aerial body $g$ through the selector device to be described later, the pressure in the chamber $r$ by its action on the capsule $t$ serving to enable a vent-opening movement to be given to the lever $n$.

In addition, the fuel passing to the burner nozzle is under the control of a second throttle $u$ which co-operates with an orifice $v$. This throttle is formed on a servo piston $w$ loaded by a spring $x$ and slidable in a cylinder $y$ having a vent 2 which is controlled by a closure member 3 on a lever 4. The vent-end of the cylinder is supplied with fuel through a restricted orifice 5. When the vent is closed the spring $x$ moves the throttle $u$ towards the orifice $v$ for restricting the fuel supply to the burner nozzle. When the vent is open the preponderating fuel pressure acting on the outer end of the piston moves the latter inwards and retracts the throttle from the said orifice. The lever 4 extends at one end through a seal $z$ into a chamber $4a$ where it is subject to the opposed actions of a spring 6 and a flexible diaphragm 7, the latter acting on the lever through the medium of thrust pieces $7a$, and being movable in the direction for closing the vent 2 by pressure of the fuel supplied through a passage 8 from the entrance side of the throttle $a$. Movement in the direction for opening the vent 2 is effected by the spring 6. Fuel escaping through the vent passes via a passage $2a$ to the outlet side of the orifice $v$.

In regulating means above described, the rate of flow of fuel from the pump to the burner nozzle $e$ is effected in part by the air or other gas pressure in the aerial body, and in part by the pressure of fuel in the pipe $c$.

One form of selector device in accordance with the invention for controlling the air or gas pressure acting on the vent lever $n$ of the servo mechanism of the throttle $a$ is shown in the middle of the drawing of Figure 1. It comprises a chambered body part 9 containing a cylindrical chamber 10 which is in communication with the chamber $r$ of the fuel regulating means by way of a pipe 11, and with the forward end of the aerial body $g$ by way of a pipe 12. One end of the chamber 10 contains a piston valve 13 which in the position shown isolates the chamber 10 from another chamber 14, the latter being in communication with the combustion chamber $f$ of the aerial body by way of a pipe 15.

In the chamber 14 is contained a pivoted stop 16 which is loaded by a spring 17, and the stop by its action on a stem 18 extending from the valve 13 holds the latter in the position shown.

For moving the stop 16 away from the stem 18 there is provided a bell crank lever 19 which at one end abuts against one side of the stop 16, and which at the other end is attached to a flexible diaphragm 20 loaded by a spring 21, the latter being arranged at one end of a sub-chamber 22 which is in communication with the chamber 14 by way of a passage 23 containing a restricted orifice 24.

When the parts of the selector device are in the condition shown in the drawing, the fuel regulating means is responsive to the air pressure (or so-called ram pressure) in the pipe 12. Later, and when a predetermined rate of increase of pressure occurs in the combustion chamber, the balance of pressures acting on the diaphragm 20 is temporarily disturbed, and the excess of pressure acting on the underside of the diaphragm 20 causes the latter to move the lever 19 in the direction for disengaging the stop 16 from the stem 18 of the valve 13. The spring 25 acting on the valve 13 then moves the latter until the stem 18 is arrested by the adjacent end of the lever 19, but this movement is insufficient to move the valve 13 out of the cylinder 10. While the pressure in the combustion chamber is rising the diaphragm 20 remains deflected, but when a steady pressure is reached the gas pressures acting on both sides of the diaphragm become equalized, and the diaphragm and lever 19 return to their previous position. As the stop 16 is prevented from returning by its contact with one side of the stem 18, the spring 25 can then move the piston valve 13 out of the cylinder 10 to a position as indicated by the dotted lines. The fuel regulating means then becomes responsive mainly to the pressure in the combustion chamber. The ram-pressure pipe 12 still remains open to the chamber 10, but the restricted orifice 27 at the entrance to the said chamber renders this pressure relatively ineffective when the valve 13 is moved out of the chamber 10. This is due to the fact that the chamber 10 is now in communication with the combustion chamber *f*, and a pressure drop is created across the restricted orifice 27 by fluid flow from the chamber 10 to the combustion chamber in which the pressure is lower than in the pipe 12.

Figure 2 illustrates a modified form of the selector device. In this example the chamber 14 contains an evacuated elastic capsule 30 which acts on one end of a lever 31, the other end of the lever being attached to a diaphragm 20, and the sub-chamber 22 is open to the atmosphere. On the lever 31 is provided a stop 16 which acts on the stem 18 of the valve 13. The ram-pressure pipe 12 is connected to the chamber 14, and the combustion chamber pressure pipe 15 is connected to the chamber 10. Further the passage 11 leading to the fuel regulating means above described is in communication with the chamber 14. Initially, the fuel regulating means is responsive to the ram pressure conveyed through the pipe 12. The ram pressure also acts on the underside of the diaphragm 20, but its effect on the diaphragm is reduced by the evacuated elastic capsule 30 which is likewise subject to the ram pressure. When this pressure exceeds a predetermined amount determined by the prevailing atmospheric pressure the stop 16 is moved away from the valve stem 18, and the spring 25 then moves the valve 13 into contact with a seating 13*a* for isolating the pipe 12 from the passage 11, and also establish communication between the pipe 15 and the passage 11.

A further modified form of selector device is shown in Figure 3. In this example the chamber 14 is connected to the pipe 12 by way of a passage 33, and the sub-chamber 22 is in communication with the pipe 15. In the chamber 14 is contained an evacuated capsule 34 which at one end is attached to the diaphragm 20 and the latter carries a valve 28 which acts on a seating 35 in communication with the pipe 11 leading to the fuel regulating means. Between the pipe 11 and the pipe 12 is arranged a passage 36 containing a restricted orifice 37. Initially the valve 28 occupies the closed position and the fuel regulating means is then responsive to the pressure in the pipe 12. When the combustion chamber pressure reaches a predetermined amount in relation to the prevailing ram pressure it causes the valve 28 to be moved to its open position by the diaphragm, it being understood that although the ram pressure in the chamber 14 is always greater than the combustion chamber pressure in the sub-chamber 22, the effect of the ram pressure on the diaphragm is reduced by the evacuated capsule which is also subject to ram pressure. The fuel regulating means is then responsive mainly to the pressure in the pipe 15, the pressure in the pipe 12 being then rendered relatively ineffective as a result of the pressure drop created across the restricted orifice 37 by fluid flow from the pipe 11 to the combustion chamber *f*.

Figure 4 illustrates a still further modification of the selector device. In this example, a body part 38 has formed in it a chamber 39 which is divided into three compartments by a pair of flexible diaphragms 40, 41 of different diameters. The two outer compartments are in communication with the atmosphere by way of passages 42, 43, and the middle compartment is in communication with the pipe 12 by way of passage 44. Also in the said body part is provided a servo mechanism comprising a cylindrical chamber 45 which contains a piston 46 loaded by a spring 47. The two ends of the chamber 45 are in mutual communication by way of a passage 48 containing a restricted orifice 49. In association with the said chamber are provided two vent passages 50, 51. The passage 50 is controlled by a closure member 52 on a lever 53 which extends through a seal 54 to the compartment associated with the smaller diaphragm 40, the lever being loaded by a spring 55. The passage 51 terminates at one end in a valve seating 56, and the other end is controlled by a closure member 57 on a lever 58 which extends through a seal 59 to the compartment associated with the larger diaphragm 41, this lever being loaded by a spring 60.

The piston 46 has formed on or secured to it a piston valve 62 slidable in a cylindrical bore 63, and on this valve is formed a circumferential groove 64 which can establish communication between the pipe 11 and any of the passages 65, 66, 67 which respectively communicate with the pipes 12, 15 and the atmosphere. Also the piston valve is hollow, and on its forward end is carried a valve 68, loaded by a spring 69 for co-operating with the seating 56. The stem of this valve is moreover adapted to allow liquid to flow past it from the chamber 45 to the closed end of the bore 63.

The arrangement is such that when the parts are in the positions shown in the drawing, ram-pressure air can pass along the pipe 12 and around the piston valve 62 to the pipe 11 leading to the fuel regulating means. When the ram pressure reaches a predetermined amount determined by the prevailing atmospheric pressure, it opens the vent 51 by its action on the lever 58 through the larger diaphragm 41. The preponderating liquid fuel pressure then acting on the right-hand side of the piston 46 causes the latter to move until the groove 64 in the piston valve 62 lies opposite the passage 66. At the same time the valve 68 approaches the seating 56 and restricts the flow through the vent passage 51 until the piston 46 attains a position of equilibrium in which the pressures acting on its opposite sides are equal. The fuel regulating means is then subject to the pressure in the combustion chamber pipe 15.

On further rise of the ram pressure the smaller diaphragm 40 is deflected (the larger diaphragm 41 having already been deflected to its maximum extent) to open the vent passage 50. The piston 46 can then again move, and after closing the valve 68 on its seating 56 and compressing the spring 69, causes the groove 64 in the piston valve 62 to come opposite the passage 67 which is open to atmosphere. The fuel regulating means is then rendered responsive to variations of atmospheric pressure.

By any of the selector devices above described the automatic change-over from control of the fuel regulating means by ram pressure, to control by combustion chamber pressure, can be effected in a convenient and reliable manner. The invention is not, however, restricted to the examples described as these may be provided in any other equivalent forms.

Having thus described our invention what we claim as new and desire to secure by Letters Patent is:

1. Means for controlling the supply of liquid fuel to a jet-propelled aerial body having a combustion chamber therein, comprising in combination with the aerial body, an air conduit leading to the combustion chamber, a first passage leading from the entrance to the air conduit, a second passage leading from the combustion chamber in the aerial body, fuel control means initially responsive to the pressure in the first passage and subsequently at least mainly to the pressure in the second passage, and an automatic selector device having a part movable in response to a pressure condition in one of the said passages from an initial position in which it isolates the second passage from the fuel control means to another position for establishing communication between the second passage and the fuel control means.

2. Means according to claim 1, in which the automatic selector device comprises in combination a body part having therein two chambers separated by a spring loaded valve, one of the chambers having an inlet for reception of air from the first passage and an exit for connection to the fuel control means, and the other chamber having an entrance for reception of gas from the second passage, a stop for holding the valve in the position in which it separates the two chambers, and a mechanism responsive to combustion chamber pressure for releasing the valve and thereby establishing communication between the two chambers.

3. Means according to claim 2 having at the entrance for reception of air from the first passage a restriction for limiting air flow from the first passage when the valve is open, and thereby rendering the fuel control means responsive mainly to the pressure in the second passage.

4. Means according to claim 1, in which the automatic selector device comprises a body part having therein two chambers, a spring-loaded valve situated between the two chambers, an elastic capsule and a flexible diaphragm interconnected by a lever in one of the chambers, a stop operable by the said lever for holding the valve in one of its positions, the chamber containing the lever having an inlet for air from the first passage and an exit for connection to the fuel control means, and also being provided with a seating on which the valve can act for isolating the said chamber from the said exit, the other chamber having an inlet for gas from the second passage.

5. Means according to claim 1, in which the automatic selector device comprises a body part divided into two chambers by a flexible diaphragm, a valve in one of the chambers for controlling an exit passage from that chamber, the second passage being in communication with the chamber containing the valve, and the first passage being in communication with the other chamber, and through a restricted orifice with the valve controlled exit passage.

6. Means according to claim 1, in which the automatic selector device comprises a body part having therein a chamber which is divided into three compartments by two flexible diaphragms of different diameters, the middle compartment having an inlet for air from the first passage, and the other two compartments being in communication with the atmosphere, a liquid operated servo mechanism consisting of a spring loaded piston slidable in a cylindrical chamber having a pair of vents, valves controlling the vents, mechanisms in the compartments communicating with the atmosphere for actuating the vent control valves in response to movements of the diaphragms, and a piston valve operable by the servo piston and adapted to establish communication with the fuel control means of the first and second passages and the atmosphere, the servo piston being also adapted to isolate one of the said vents.

References Cited in the file of this patent
UNITED STATES PATENTS

| | | |
|---|---|---|
| 2,747,366 | Barnes et al. | May 29, 1956 |
| 2,766,580 | Buerer et al. | Oct. 16, 1956 |